Jan. 19, 1971  S. M. LINDBLAD  3,555,632
SAFETY BELT CLASP
Filed Sept. 26, 1968  2 Sheets-Sheet 1
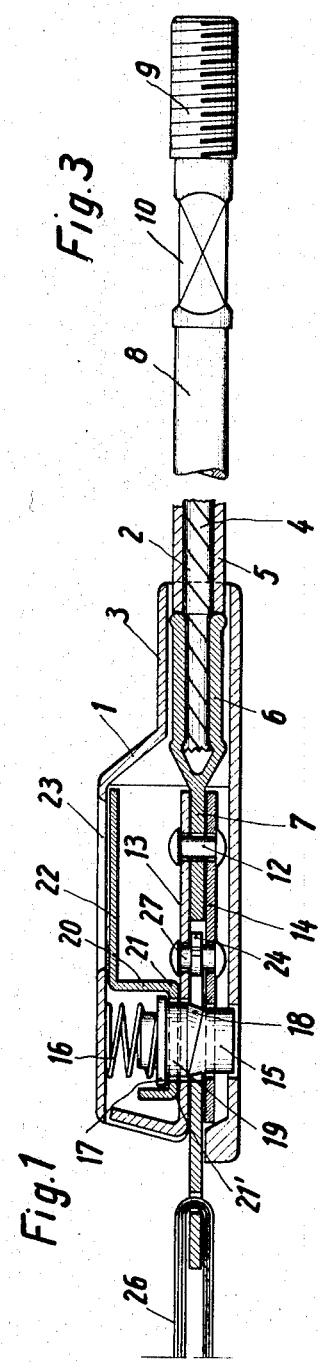
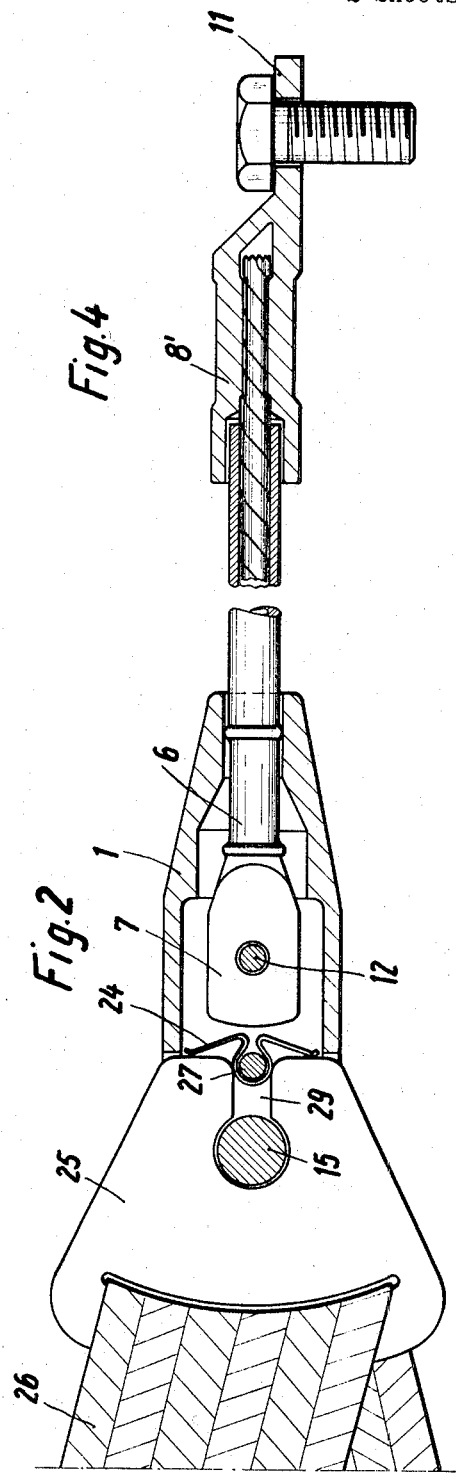
Inventor:
STIG MARTIN LINDBLAD
BY McGlew and Toren
ATTORNEYS Jan. 19, 1971   S. M. LINDBLAD   3,555,632
SAFETY BELT CLASP
Filed Sept. 26, 1968   2 Sheets-Sheet 2
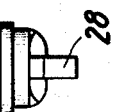
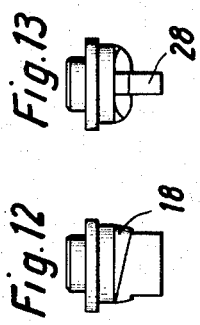
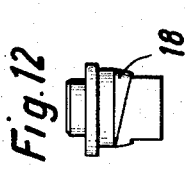
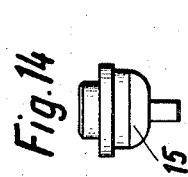
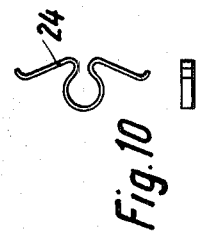
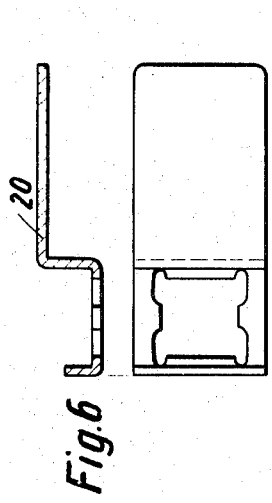
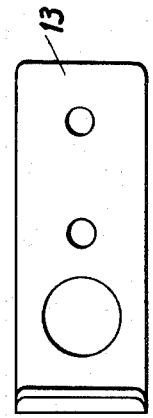
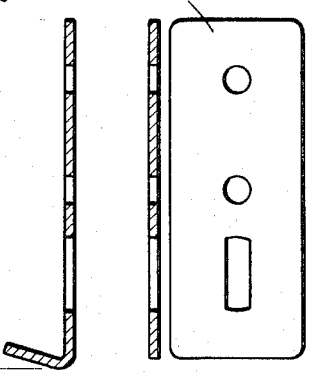
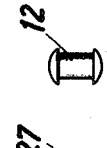
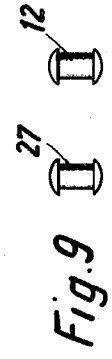
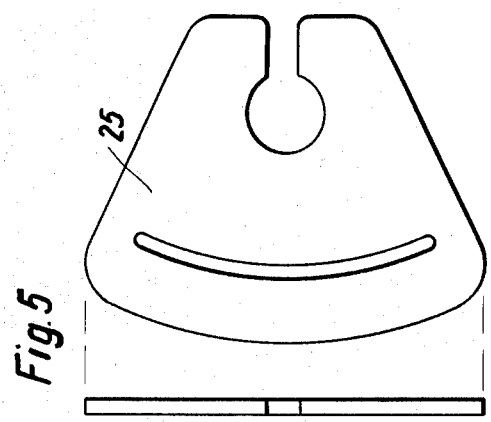
Inventor:
STIG MARTIN LINDBLAD
BY McGlew and Toren
ATTORNEYS

ABSTRACT OF THE DISCLOSURE

A safety belt clasp is formed of a clasp housing connected with one of the pull members of the belt and has connected with the further pull member and adapted to be pushed into the housing, the tongue being formed with a slot and, on being pushed into the housing, lifting the retaining pawl against the spring pressure until it snaps into its locking position and retains the tongue, whereas it is once again released when the retaining pawl is lifted by means of a manipulating means.

SUMMARY OF THE INVENTION

The present invention is directed to a safety belt clasp and, more particularly, it concerns a retaining pawl for locking the clasp and means for releasing the pawl.

The invention is based on a problem of how to design a safety belt clasp of this kind in a novel manner and such that it shall be as easy and reliable to operate as possible and shall have a minimum of individual parts.

According to the invention, this is achieved by the arrangement whereby the retaining pawl is formed on a pin guided for displacement perpendicular to the direction of the tensile force, against the pressure of a spring, the said pin having a collar bearing on one of the limb faces of a Z-shaped triggering lever which bears flat on a face connected with the clasp housing and, for the purpose of trigering the pawl, is adapted to be tilted relatively to the said face about an edge extending transversely of the belt pull direction.

In the following text, the invention and its advantages are, together with further details discussed by way of example and with reference to the drawings, wherein:

FIG. 1 shows a longitudinal section through the safety belt clasp,

FIG. 2 shows a plan view of the clasp, partly in section,

FIGS. 3 and 4 show further possible modes of designing one of the pull members, connected with the vehicle and engaged to the safety belt clasp; the remaining figures show individual parts, i.e.

FIG. 5 shows two views of the tongue,

FIG. 6 shows the triggering lever (two views),

FIG. 7 shows one of the guide plates for the pawl pin (two views),

FIG. 8 shows the other guide plate for the pawl pin (two views),

FIG. 9 shows the two securing rivets,

FIG. 10 shows the restoring spring for the tongue,

FIG. 11 shows the restoring spring for the pawl pin,

FIGS. 12 and 13 show the pawl pin (two views),

FIGS. 14 and 15 show two further views of the same pawl pin.

Referring to FIGS. 1 and 2, reference numeral 1 designates the clasp housing which merges into a sleeve 3 pushed on to one of the pull members 2. The pull member 2 contains a core 4 having the form of a wire cable provided with a flexible plastics sheath 5 secured to the end of which is a shoe 6 merging into a plate 7. The other end of the pull member 2 is secured in a shoe 8 or 8' which may be provided, in a coaxial screwthreaded pin 9, with a flattened portion 10 for the engagement of a spanner, or with an eyelet 11 for a securing screw. The plate 7 on the shoe 6 is connected, by means of a rivet 12, with the two guide plates 13, 14. Reference numeral 15 designates a pin which is guided in apertures formed in these two plates, against the pressure of a spring 16, and has a collar 17. On the pin, the retaining pawl 18 is designed to be symmetrical at both sides of the pin. The pin bears, through the agency of its collar, on one limb face 19 of a Z-shaped triggering or release lever 20 which bears flat on the plate 13 and is, for the purpose of triggering the pawl, adapted to be tilted relatively to this plate about an edge extending transversely of the belt pull direction. The further limb face 22 of the Z-shaped lever 20 serves as a manipulating means for the triggering operation, being in this example of the invention a pressure key. The limb face is arranged within the clasp housing 1 and is accessible through a recess 23 in the wall thereof, so that it supplements, substantially, the wall of the clasp body in the zone of the recess. If the manipulating means 22 is made operative by pressure, the triggering lever pivots about the edge 21, thereby displacing the pin upwardly and in this way releasing the pawl 18. If the recess 23 in FIG. 1 extends still further towards the right, as far as into the zone of the oblique face of the clasp body, then the manipulating means may serve, instead of constituting a pressure key, as a pull lever. When the latter is actuated, the trigering lever 20 tilts about the edge 21' in the left-hand direction of rotation, with the same result, i.e. that the pin 15 is raised and the pawl 18 is released. On releasing the pawl, the symmetrical leaf spring 24 acts on the tongue 25 in the manner of a restoring spring. The tongue 25 constitutes the releasable element of the safety belt clasp, which said element is connected with the further pull member, in this case the belt 26 extending through it. The leaf spring 24 is mounted on the rivet 27 connecting the two guide plates 13, 14.

The guide means for the displaceable pin 15 is formed by coaxial apertures in the two plates 13, 14. In this manner, the clasp housing 1 and the Z-shaped triggering lever 20 are relieved of tensile force. The latter is taken up solely by the pin 15 with the pawl 18. As FIGS. 12–14 show, the triggering pawl 18 has, on both sides of a portion 28, which is flattened in plate-like manner, of the displaceably guided pin 15, two oblique faces. The aperture, serving for guiding the said plate-shaped portion 28 of the pin, and formed in one of the plates 14 fast with the pull member 2 is adapted to the cross-section of the plate-shaped portion. The tongue 25 is formed with a slot 29 in order that it may be pushed over the pin 15 in the zone of the plate 28.

The various possibilities for the application and performance of the novel safety belt clasp are not restricted solely to the examples shown here in detail. This relates to the application and design thereof in combination with a so-called Y- or V-belt, with which arrangement the pull member 2 pushed into the clasp housing is designed to be semi-rigid, whereas the further pull member 26 is a continuous belt pushed loosely through an aperture in the tongue 25 and both parts of which constitute a breast belt and a hip belt. However, the novel belt clasp may be advantageously used also in combination with other types of belts.

I claim:

1. A safety belt clasp arranged for releasably securing together two pull members of a safety belt and comprising a housing arranged to be affixed to the end of one said pull member and having an opening therein spaced from the one said pull member, a pair of guide plates disposed within said housing and arranged to be secured to the end of the one said pull member therein, said guide plates arranged in spaced apart and susbtantially parallel relationship and each having a hole therein aligned with the hole formed in the other, a tongue member arranged to be secured to the end of the other said pull member and to extend outwardly therefrom in the direction in which the other said pull member extends, said tongue arranged to be inserted into said housing through the opening therein and to be releasably secured therein between and in substantially parallel relationship with said guide plates, said tongue having a slot therein extending rearwardly from the leading edge thereof arranged to be inserted into said housing in the direction of the other said pull member, said slot being enlarged at its rearward end relative to its leading edge end, an axially extending pawl pin positioned within said housing and arranged to be aligned with the slot in said tongue, said pawl pin extending through and guided by the holes in said guide plates, a collar extending laterally outwardly about the periphery of said pawl pin and said collar spaced from said guide plates, spring means located within said housing in contact with said collar therein for biasing said pawl pin into the path of said tongue, said pawl pin being shaped so that the edge surfaces of the slot in said tongue contacts said pin as said tongue is inserted into said housing and displaces said pin in its axial direction against the force of said spring means until the enlarged inner end of said slot reaches said pin and said pin then is biased into locking contact with said tongue by said spring means, and lever means located within said housing for displacing said pin against the action of said spring means and releasing said tongue from said housing, said lever means comprising a Z-shaped lever member comprising a first leg having a first surface thereof supported on one of said guide plates and a second surface thereof opposite said first surface in contact with said collar on said pawl pin, a connector member secured to said first leg at a position spaced from said pawl pin and extending angularly away from said first leg and said guide plates, a second leg secured to and projecting angularly from the end of said connector member opposite the end thereof connected to said first leg and said second leg extending from said connector member in the direction opposite to which said first leg extends from said connector member so that by displacing said second leg in the direction of said guide plates said Z-shaped lever pivots about the common edge of said first leg and connector member and the said first leg lifts said pawl pin against the biasing action of said spring means for releasing said tongue from locking engagement with said pawl pin.

2. A safety belt clasp, as set forth in claim 1, wherein a second opening is formed in said housing spaced from the opening therein for receiving said tongue, said second leg of said lever located within and accessible through the second opening in said housing so that said second leg can be displaced toward said guide plates for pivoting said first leg and displacing said pawl pin.

3. A safety belt clasp, as set forth in claim 2, wherein said first and second legs of said lever are disposed in spaced substantially parallel planes and said connector member is positioned normally to both of said legs.

4. A safety belt clasp, as set forth in claim 3, wherein a spring member positioned within said housing between said guide plates and arranged to contact the leading edge of said tongue in its inserted position in locked engagement with said pawl whereby when said pawl pin is released from locking engagement with said tongue said spring member displaces said tongue from said housing.

5. A safety belt clasp, as set forth in claim 4, wherein said pawl pin having a narrow axially extending section at one end with the sides thereof arranged in parallel relationship and being arranged to fit within and in sliding engagement with the slot in said tongue, a pair of sloping surfaces located at and extending outwardly from the end of said narrow section intermediate the ends of said pin, said sloping surfaces arranged to contact the edges of the slot in said tongue and to displace said pin against said spring means as said tongue is progressively inserted into said housing, and said collar being located on the opposite side of said sloping surfaces from said narrow section.

6. A safety belt clasp, as set forth in claim 5, wherein said spring means comprising a helical spring abutting said collar on said pawl pin at one end and against the inner surface of said housing at the other end and a portion of said pawl pin extending axially within said helical spring for securing said spring on the end of said pawl pin.

References Cited

UNITED STATES PATENTS

| 3,099,870 | 8/1963 | Seeler | 24—230.1L |

FOREIGN PATENTS

| 1,328,405 | 4/1963 | France | 24—230.1L |
| 1,409,848 | 7/1965 | France | 24—230.1L |

KENNETH DOWNEY, Primary Examiner